(12) United States Patent
Uchiyama et al.

(10) Patent No.: US 9,600,036 B2
(45) Date of Patent: Mar. 21, 2017

(54) HINGE DEVICE FOR A PORTABLE COMPUTER

(71) Applicant: LENOVO (SINGAPORE) PTE. LTD., Singapore (SG)

(72) Inventors: Yoshiharu Uchiyama, Kanagawa-ken (JP); Shigehiro Horiuchi, Tokyo-to (JP); Masayoshi Nakano, Tokyo-to (JP); Ryota Nohara, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 15/060,394

(22) Filed: Mar. 3, 2016

(65) Prior Publication Data

US 2016/0259379 A1 Sep. 8, 2016

(30) Foreign Application Priority Data

Mar. 6, 2015 (JP) .................................. 2015-044533

(51) Int. Cl.
*G06F 1/16* (2006.01)

(52) U.S. Cl.
CPC .......... *G06F 1/1681* (2013.01); *G06F 1/1618* (2013.01)

(58) Field of Classification Search
CPC .................................................... G06F 1/1681
See application file for complete search history.

(56) References Cited

U.S. PATENT DOCUMENTS 6,564,428 B2 * 5/2003 Richard .................. E05D 3/127
16/335
8,776,319 B1 * 7/2014 Chang .................. G06F 1/1681
16/303

(Continued)

FOREIGN PATENT DOCUMENTS

| JP | 2010020722 A | 1/2010 |
| JP | 2013155874 A | 8/2013 |
| JP | 2014-238764 A | 12/2014 |

*Primary Examiner* — Anthony Q Edwards
(74) *Attorney, Agent, or Firm* — Russell Ng PLLC; Antony P. Ng

(57) ABSTRACT

A hinge device capable of reducing a reduced-size biaxial structure that can selectively switch rotations of two shafts according to an opening/closing angle position between two chassis is disclosed. The hinge device includes a first shaft attached to a first chassis, and a second shaft attached to a second chassis. The first shaft includes a recess located on an outer peripheral surface of the first shaft, and the second shaft includes a recess located on an outer peripheral surface of the second shaft. The hinge device also includes a lock member having a first projection engageable the said first recess, a second projection engageable with the second recess, and an arm member coupling the first projection to the second projection. The lock member allows rotation of one of the first shaft or the second shaft and restricts rotation of each other according to an opening/closing angle position between the first chassis and the second chassis by alternately performing engagement of the first projection with said first recess and engagement of the second projection with the second recess by means of sway of the arm member.

10 Claims, 4 Drawing Sheets

(56) References Cited

U.S. PATENT DOCUMENTS

| | | | |
|---|---|---|---|
| 9,009,919 B1 * | 4/2015 | Chiang | G06F 1/1681 16/303 |
| 2006/0238968 A1 * | 10/2006 | Maatta | H04M 1/0218 361/679.01 |
| 2007/0151381 A1 * | 7/2007 | Pelkonen | G06F 1/1616 74/437 |
| 2009/0013500 A1 * | 1/2009 | Ueyama | G06F 1/1616 16/354 |
| 2011/0265288 A1 * | 11/2011 | Chiang | G06F 1/1681 16/341 |

* cited by examiner

HINGE DEVICE FOR A PORTABLE COMPUTER

PRIORITY CLAIM

The present application claims benefit of priority under 35 U.S.C. §120, 365 to the previously filed Japanese Patent Application No JP2015-044553 with a priority date of Mar. 6, 2015, which is incorporated by reference herein.

BACKGROUND OF THE INVENTION

1. Technical Field

The present invention relates to hinge devices in general, and particularly to a portable computer having a hinge device for coupling two chassis to each other to allow the two chassis to be opened and closed.

2. Description, of Related Art

In recent years, tablet personal computers (tablet PCs) with touch panel liquid crystal displays but no physical keyboard have become very popular. Tablet PC, which is easily portable and on which an input operation can be performed through a touch panel, can be easily operated.

However, a tablet PC does not include a physical keyboard, and thus, operations, such as an input of a long sentence, can be hindered. In view of this, a so-called convertible PC in which a display chassis provided with a display can rotationally moves to 360 degrees through 180 degrees with respect to a main body chassis provided with a keyboard is proposed. The convertible PC can be used in two ways, i.e., as a general laptop PC and a tablet PC, and thus, is very convenient for a user. A hinge device having a biaxial structure can be provided for the configuration described above.

The hinge device includes a pin capable of reciprocating between two shafts, and the pin is transferred between recessed portions formed in outer peripheral surfaces of the two shafts. In this manner, rotation of a shaft engaged with the pin is restricted, and rotation of the shaft not engaged with the pin is allowed so that it is selectively switched which one of the two shafts is rotated in accordance with an opening/closing angle position of the display chassis.

A chassis structure of portable information equipment has been rapidly downsized. Thus, a hinge device for coupling two chassis to each other also has needed to conform with the reduced thickness of equipment by reducing the distance between two shafts that are arranged in a thickness direction of the chassis.

In this respect, a pin is interposed between two shafts, and thus, the distance between the two shafts needs to be greater than or equal to an outer diameter of the pin. In addition, in this configuration, rotation of one of the shafts is stopped by engaging the pin with the recessed portion of each of the shafts, and thus, the outer diameter of the pin needs to be large to a certain degree. For this reason, it is difficult to further reduce the size of the configuration of the hinge device.

Consequently, it would be desirable to provide an improved hinge device that can selectively switch rotation of two shafts in accordance with an opening/closing angle position between two chassis.

SUMMARY OF THE INVENTION

In accordance with a preferred embodiment of the present invention, a hinge device capable of reducing a reduced-size biaxial structure that can selectively switch rotations of two shafts according to an opening/closing angle position between two chassis is disclosed. The hinge device includes a first shaft attached to a first chassis, and a second shaft attached to a second chassis. The first shaft includes a recess located on an outer peripheral surface of the first shaft, and the second shaft includes a recess located on an outer peripheral surface of the second shaft. The hinge device also includes a lock member having a first projection engageable the said first recess, a second projection engageable with the second recess, and an arm member coupling the first projection to the second projection. The lock member allows rotation of one of the first shaft or the second shaft and restricts rotation of each other according to an opening/closing angle position between the first chassis and the second chassis by alternately performing engagement of the first projection with said first recess and engagement of the second projection with the second recess by means of sway of the arm member.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
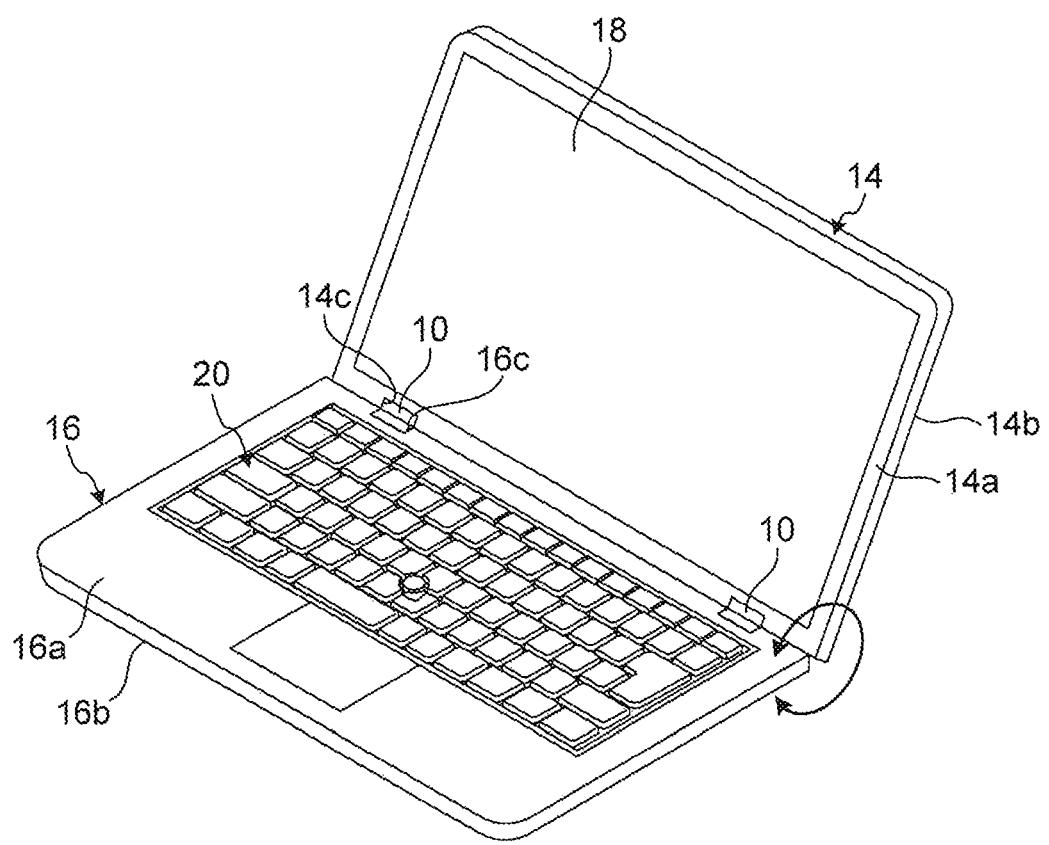
FIG. 1 is a perspective view of a portable computer having a hinge device, in accordance with a preferred embodiment of the present invention.

Referring now to the drawings and in particular to FIG. 1, there is depicted is a perspective view of portable information equipment 12 including a hinge device 10 according to an embodiment of the present invention, and illustrates a state of use in a laptop PC in which a display chassis 14 is opened from a main body chassis 16 by using the hinge device 10. FIGS. 2A-2C and FIGS. 3A-3B schematically illustrate rotational movement of the display chassis 14 with respect to the main body chassis 16 using the hinge device 10.

Figure 3A:
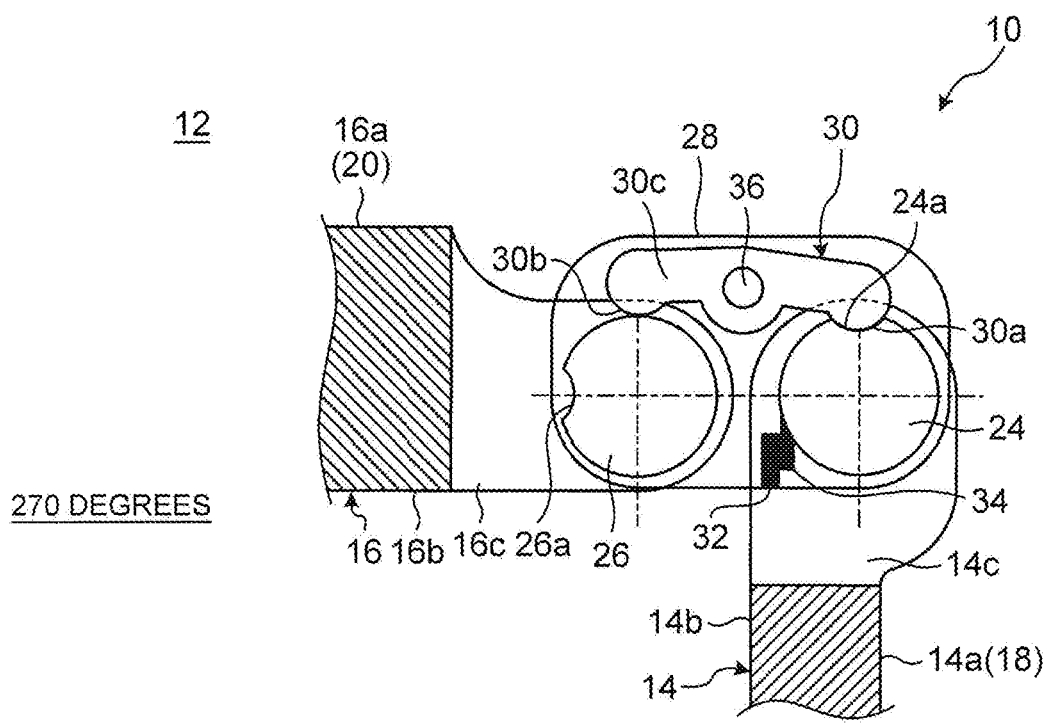
FIGS. 3A-3B illustrate rotational movement of the display chassis with respect to the main body chassis using the hinge device from FIGS. 2A-2C.
Figure 3B:
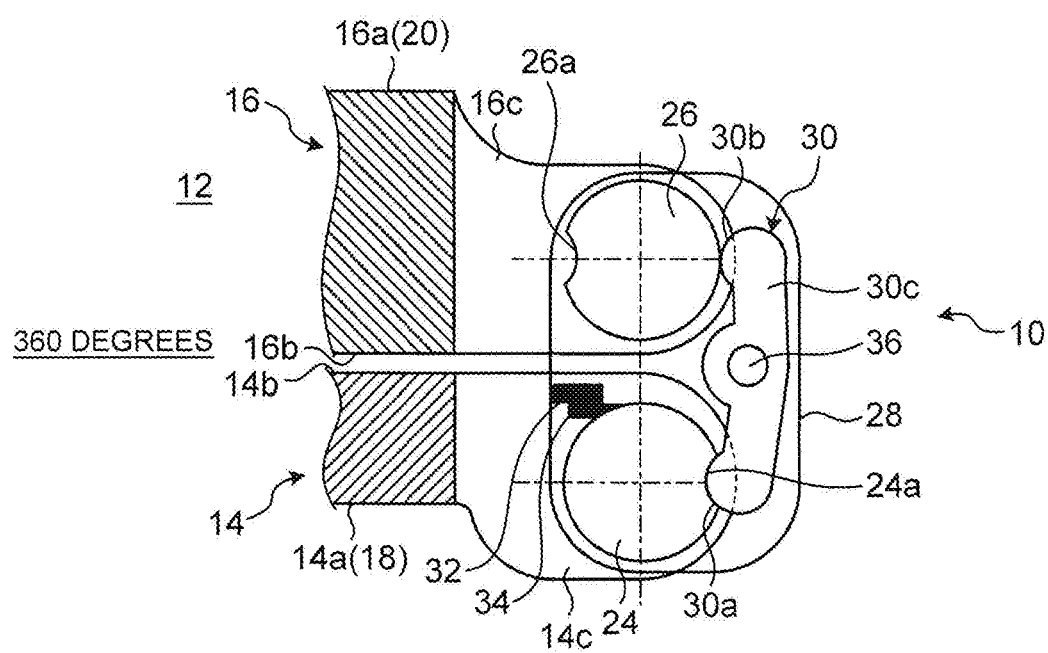

The portable information equipment 12 of this embodiment is a so-called convertible PC that is favorably used as a laptop PC by rotating the display chassis 14 to an about 90-degree position with respect to the main body chassis 16 (see FIG. 1 and FIG. 2B), and is favorably used as a tablet PC by rotating the display chassis 14 to a 360-degree position with respect to the main body chassis 16 (see FIG. 3B). The present invention is applicable not only to such convertible PCs but also to, for example, cellular phones, smart phones, and electronic organizers.

Figure 2A:
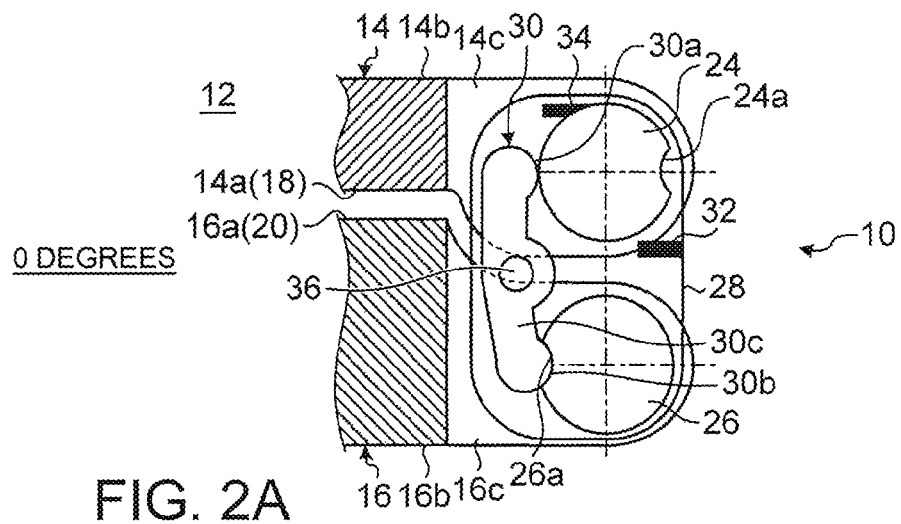
FIGS. 2A-2C illustrate rotational movement of a display chassis with respect to a main body chassis using the hinge device from FIG. 1.
Figure 2B:
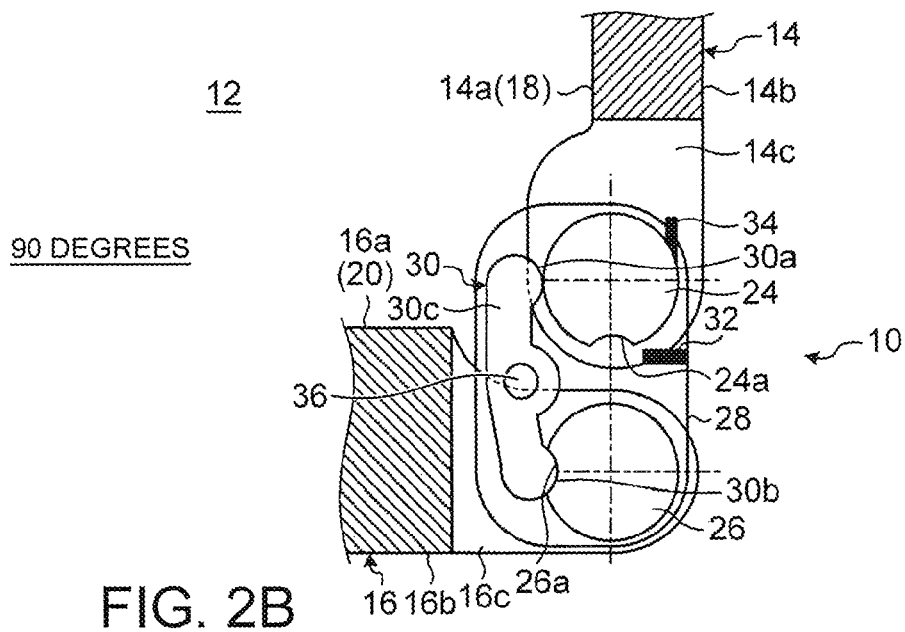

As illustrated in FIG. 2A, the following description will be made based on a state in which the display chassis 14 is closed with respect to the main body chassis 16 (0-degree position), ends of the display chassis 14 and the main body chassis 16 facing the hinge device 10 will be referred to as back ends (backward), their opposite ends of the display chassis 14 and the main body chassis 16 will be referred to as front ends (forward), a thickness direction will be referred to as a vertical direction, and a width direction will be hereinafter referred to as a lateral direction.

For descriptive convenience of description on angle positions between the main body chassis 16 and the display chassis 14 formed by using the hinge device 10, it is assumed that a position in which the display chassis 14 is completely closed with respect to the main body chassis 16 and a lower surface (inner surface) 14a of the display chassis 14 faces an upper surface (inner surface) 16a of the main body chassis 16 will be referred to as a 0-degree position (see FIG. 2A). Description will be made by changing the angle in a direction to move the display chassis 14 rotationally in the opening direction, using this 0-degree position as a reference. For example, a position in which the display chassis 14 is substantially orthogonal to the main body chassis 16 will be referred to as a 90-degree position (see FIGS. 1 and 2B), and a position in which the lower surface 14a of the display chassis 14 and the upper surface 16a of the main body chassis 16 face in an identical direction (upward) and are in parallel with each other will be referred to as a 180-degree position (see FIG. 2C). In addition, a position in which an upper surface (outer surface) 14b of the display chassis 14 faces a lower surface (outer surface) 16b of the main body chassis 16 will be referred to as a 360-degree position (see FIG. 3B). The 0-degree position, the 90-degree position, the 180-degree position, and the 360-degree position, for example, can be, of course, slightly shifted from accurate angle positions indicated by angle numbers because of the structure of the main body chassis 16, the display chassis 14, or the hinge device 10. In this embodiment, these shifted angle positions are included in the angle positions such as the 0-degree position.

As illustrated in FIGS. 1-3B, in the portable information equipment 12, a back end portion of the display chassis 14 provided with a display 18 in the lower surface 14a thereof is rotatably coupled to a back end portion of the main body chassis 16 provided with a keyboard 20 in the upper surface 16a thereof by using a pair of left and right hinge devices 10 and 10.

The display chassis 14 has a flat plate shape thinner than the main body chassis 16. The display chassis 14 is coupled to the main body chassis 16 by the hinge devices 10 provided on the back end portion thereof, and is electrically connected to the main body chassis 16 through illustrated cables passing through the hinge devices 10. The display 18 is constituted by a touch panel liquid crystal display device, for example.

The main body chassis 16 is a box having a flat plate shape. The main body chassis 16 is coupled to the display chassis 14 by using the hinge devices 10 provided on the back end portion of the main body chassis 16. The upper surface 16a of the main body chassis 16 is provided with an input unit such as the keyboard 20. The main body chassis 16 includes, therein, a board, an arithmetic unit, and electronic parts such as a memory, which are not illustrated. The keyboard 20 may be configured to be shown on an unillustrated touch panel display provided on the upper surface 16a of the main body chassis 16.

A specific example configuration of each of the hinge devices 10 will be described.

The hinge device 10 enables the display chassis 14 to rotate from the 0-degree position to the 360-degree position by using the biaxial structure. As illustrated in FIGS. 2A-3B, the hinge device 10 includes a first shaft 24 extending in the lateral direction, a second shaft 26 in parallel with the first shaft 24, and a box-shaped hinge block (hinge chassis) 28 rotatably holding the first shaft 24 and the first shaft 26. In the hinge block 28, a lock member 30 that is supported to be swayable is disposed at a side of the first shaft 24 and the second shaft 26 that are disposed side by side in the vertical direction.

The first shaft 24 integrally rotates with the display chassis 14 by inserting and fixing one or both ends of the first shaft 24 into unillustrated fitting holes provided in the display chassis 14. The second shaft 26 integrally rotates with the main body chassis 16 by inserting and fixing one or both ends of the second shaft 26 into unillustrated fitting holes provided in the main body chassis 16. The first shaft 24 and the second shaft 26 are rotatably held by the hinge block 28, and project one or both of the left and right side surfaces of the hinge block 28 to be coupled to the display chassis 14 and the main body chassis 16, respectively. In this manner, the display chassis 14 is supported to rotate about the hinge block 28 together with the first shaft 24, and the main body chassis 16 is rotatably supported to rotate about the hinge block 28 together with the second shaft 26.

An outer peripheral surface of the first shaft 24 includes a depression-shaped recess (first recess) 24a having an arc shape in cross section. An outer peripheral surface of the second shaft 26 has a depression-shaped recess (second recess) 26a having an arc shape in cross section. As illustrated in FIG. 2A, in a state where the display chassis 14 is in the 0-degree position with respect to the main body chassis 16, the recess 24a of the first shaft 24 faces backward, and the recess 26a of the second shaft 26 faces forward. That is, in this embodiment, the recesses 24a and 26a are inverted to each other by 180 degrees in the 0-degree position.

The hinge block 28 is a rectangular box-shaped member, and extends between a notch 14c provided in the back end portion of the display chassis 14 and a notch 16c provided in the back end portion of the main body chassis 16. An upper end of the hinge block 28 is supported by the display chassis 14 through the first shaft 24, and a lower end of the hinge block 28 is supported by the main body chassis 16 through the second shaft 26. A stopper piece 32 is provided in a protruding manner on an inner surface or an outer surface of the hinge block 28. The stopper piece 32 is a member configured to come into contact with a projection piece 34 fixed to the first shaft 24 at the side of the display chassis 14 opened to be in the 180-degree position and, thereby, restrict further rotational movement.

The lock member 30 includes a projection 30a facing the outer peripheral surface of the first shaft 24, a projection 30b facing the outer peripheral surface of the second shaft 26, and a rod-shaped arm member 30c coupling the projections 30a and 30b to each other. The projection 30a has an arc shape in cross section engageable with the recess 24a provided in the outer peripheral surface of the first shaft 24. The projection 30b has an arc shape in cross section engageable with the recess 26a provided in the outer peripheral surface of the second shaft 26. An approximately center portion of the arm member 30c between the projections 30a and 30b at both ends is supported by the hinge block 28 through a rotation shaft 36.

In the manner described above, the lock member 30 has a seesaw structure that can sway, with respect to the rotation shaft 36, from a tilt position in which the projection 30a approaches the first shaft 24 and the projection 30b moves away from the second shaft 26 to a tilt position in which the projection 30a moves away from the first shaft 24 and projection 30b approaches the second shaft 26. In this manner, the lock member 30 can alternately operate in a position (see, for example, FIG. 3A) in which the projection 30a is engaged with the recess 24a of the first shaft 24 and the projection 30b is disengaged from the recess 26a of the second shaft 26 and a position (see, for example, FIG. 2A) in which the projection 30a is disengaged from the recess 24a of the first shaft 24 and the projection 30b is engaged with the recess 26a of the second shaft 26.

Then, rotational movement of the display chassis 14 and the main body chassis 16 using the hinge device 10 will be described.

First, in the 0-degree position illustrated in FIG. 2A, the projection 30b of the lock member 30 is engaged with the recess 26a of the second shaft 26 and the projection 30a is in contact with the outer peripheral surface of the first shaft 24. In this manner, the lock member 30 restricts rotation of the second shaft 26 and the main body chassis 16 and the second shaft 26 are integrated with the hinge block 28.

Thus, when the display chassis 14 in the 0-degree position rotates in the opening direction from the main body chassis 16, the display chassis 14 rotationally moves together with the first shaft 24 with respect to the main body chassis 16, the second shaft 26, and the hinge block 28 by using the first shaft 24 as a rotating axis. At this time, the projection 30a of the lock member 30 slidingly contacts the outer peripheral surface of the first shaft 24. Consequently, in positions around the 90-degree position illustrated in FIG. 2B, the portable information equipment 12 can be used as a laptop PC.

Figure 2C:
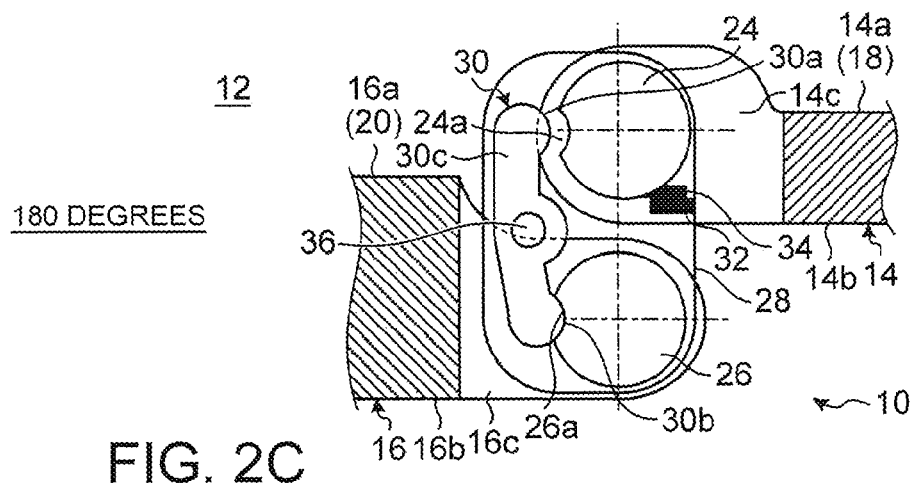

In the 180-degree position illustrated in FIG. 2C, the projection piece 34 on the first shaft 24 is in contact with the stopper piece 32 on the hinge block 28, and rotational movement of the display chassis 14 using the first shaft 24 as a rotating axis is restricted. In this state, the recess 24a of the first shaft 24 faces in the same direction as the recess 26a of the second shaft 26, and can receive the projection 30a of the lock member 30.

Thus, when the display chassis 14 is rotationally moved in the opening direction from the 180-degree position, the display chassis 14 and the first shaft 24 are integrated with the hinge block 28 with the stopper piece 32 sandwiched therebetween as illustrated in FIG. 3A, and starts moving rotationally using the second shaft 26 as a rotating axis. With this rotational movement, in the lock member 30, the projection 30a is engaged with the recess 24a of the first shaft 24 at the same time as disengagement of the projection 30b from the recess 26a of the second shaft 26, and integration of the main body chassis 16 and the second shaft 26 with the hinge block 28 is canceled. Consequently, as illustrated in FIGS. 3A and 3B, in a position shifted from the 180-degree position in the opening direction, the display chassis 14 and the first shaft 24 are integrated with the hinge block 28 and rotationally move with respect to the main body chassis 16 using the second shaft 26 as a rotating axis. At this time, the projection 30b of the lock member 30 contacts the outer peripheral surface of the second shaft 26 slidingly.

Finally, as illustrated in FIG. 3B, the display chassis 14 becomes situated at the lower surface 16b of the main body chassis 16 to reach the 360-degree position, allowing the portable information equipment 12 to be used as a tablet PC.

In this manner, the lock member 30 of the hinge device 10 has a rotation shaft selecting function of allowing rotation of one of the first shaft 24 or the second shaft 26 and restricting rotation of the other in accordance with an opening/closing angle position between the display chassis 14 and the main body chassis 16, by alternately engaging the projection 30a with the recess 24a and engaging the projection 30b with the recess 26a by means of sway of the arm member 30c.

Figure 4A:
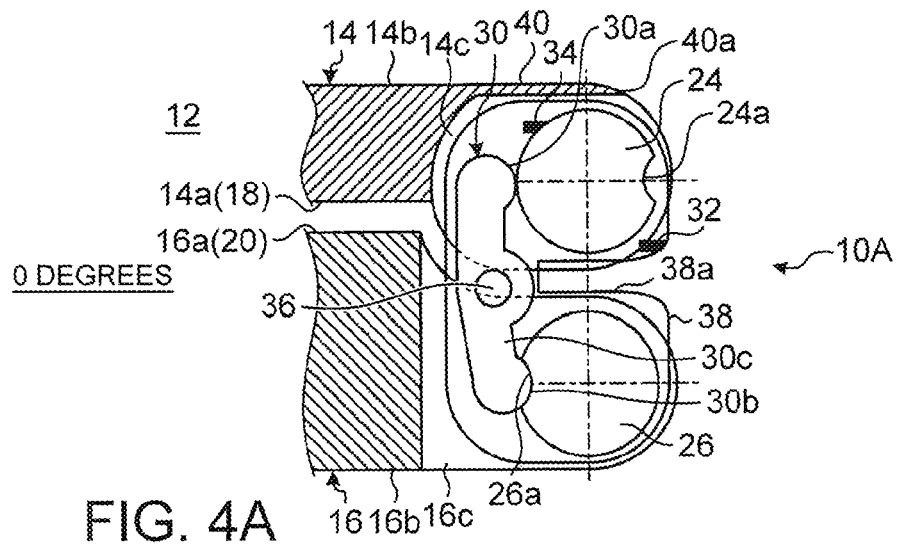
FIGS. 4A-4C illustrate rotational movement of a display chassis with respect to a main body chassis using a hinge device according to various embodiments of the present invention.
Figure 4B:
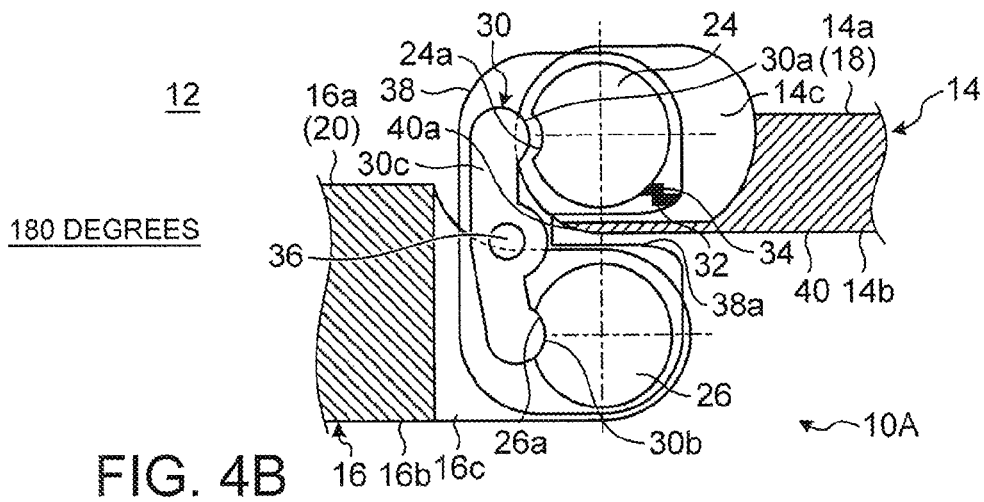
Figure 4C:
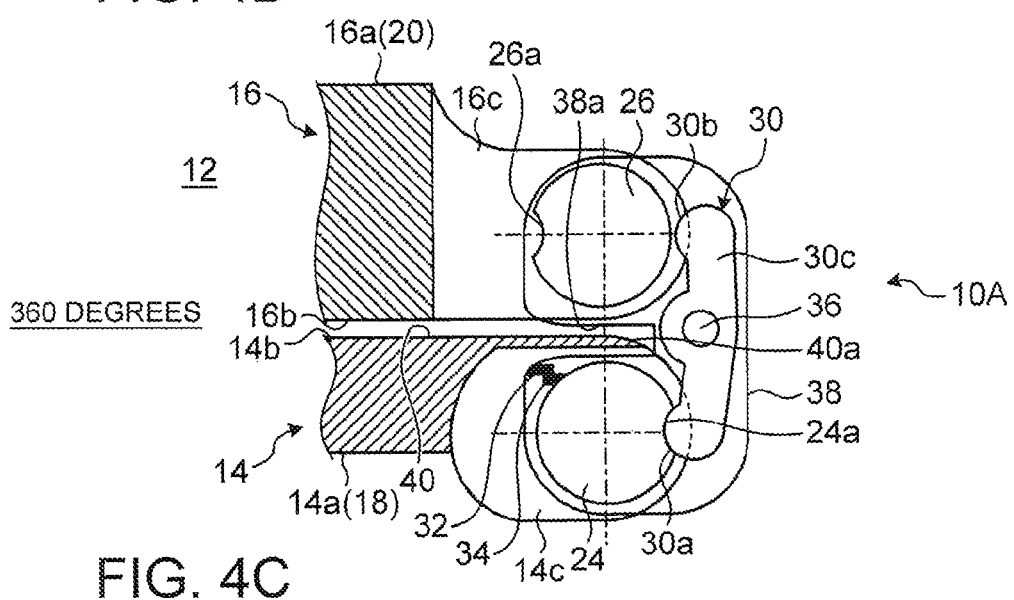

FIGS. 4A-4C schematically illustrate rotational movement of the display chassis 14 with respect to the main body chassis 16 using a hinge device 10A according to a variation of the embodiment. In FIGS. 4A-4C, reference characters also shown in FIGS. 1-3B denote components having like or the same functions and advantages, and description thereof will not be repeated.

The hinge device 10A illustrated in FIG. 4 is different from the hinge device 10 illustrated in FIGS. 2A-2C and FIGS. 3A-3B in including a hinge block 38 whose shape is different from that of the hinge block 28. The hinge block 38 includes a run-off portion 38a that is provided in an outer surface of the hinge block 38 facing a back end in a 0-degree position and is recessed toward the front end to be located between a first shaft 24 and a second shaft 26.

Portable information equipment 12 including this hinge device 10A has a configuration in which a back end 40a of a top plate 40 constituting an upper surface 14h of a display chassis 14 extends backward to cover an opening over a notch 14c in which the hinge block 38 is disposed. With this configuration, four sides of the top plate 40 including no notch 14c for the hinge device 10 linearly extend to form a square and the hinge device 10A is not conspicuous in outer appearance so that an appearance quality of the portable information equipment 12 is enhanced.

In the hinge device 10A as described above, in a manner similar to the hinge device 10 illustrated in FIGS. 2A-2C and FIGS. 3A-3B, a rotation shaft selecting function of a lock member 30 enables the display chassis 14 to move rotationally with respect to the main body chassis 16 from a 0-degree position (see FIG. 4A) to a 360-degree position (see FIG. 4C) through a 180-degree position (see FIG. 4B).

In addition, in the hinge device 10A, since the hinge block 38 has the run-off portion 38a, in rotational movement from the 0-degree position illustrated in FIG. 4A to the 180-degree position illustrated in FIG. 4B, the display chassis 14 moves rotationally while the back end 40a of the top plate 40 serving as a back end of an upper surface 14b of the display chassis 14 is entering the run-off portion 38a of the hinge block 38. Then, in the 180-degree position illustrated in FIG. 4B, the back end 40a of the top plate 40 is completely housed in the run-off portion 38a of the hinge block 38, and in this state, the display chassis 14 moves rotationally to the 360-degree position illustrated in FIG. 4C.

In this manner, since the hinge device 10A includes the run-off portion 38a in the outer surface of the hinge block 38, interference of the top plate 40 (the upper surface 14b of the display chassis 14) covering a portion above the hinge block 38 with the outer surface of the hinge block 38 can be avoided. Thus, in the portable information equipment 12 having an enhanced appearance quality by forming the top plate 40 having no notch as the upper surface 14b of the display chassis 14 and covering the hinge device 10A from above, the display chassis 14 can smoothly move rotationally to the 360-degree position. In other words, in the chassis of the hinge device 10A including the run-off portion 38a as described above, although it is difficult to provide a pin, for example, between shafts 24 and 26 as in the related art technique described above, the lock member 30 is applicable to the hinge block 38 including the run-off portion 38a because the lock member 30 is disposed at a side of the shafts 24 and 26.

As described above, the hinge device 10 (10A) of this embodiment includes the projection 30a engageable with the recess 24a provided in the outer peripheral surface of the first shaft 24, the projection 30b engageable with the recess 26a provided in the outer peripheral surface of the second shaft 26, and the lock member 30 disposed at a side of the first shaft 24 and the second shaft 26 that are arranged side by side and including an arm member 30c that couples the projection 30a and the projection 30b to each other and is swayable by supporting a portion of the arm member 30c between the projection 30a and the projection 30b by the rotation shaft 36. The lock member 30 allows rotation of one of the first shaft 24 or the second shaft 26 and restricts rotation of the other in accordance with the opening/closing angle position between the display chassis 14 and the main body chassis 16 by alternately engaging the projection 30a with the recess 24a and engaging the projection 30b with the recess 26a by means of sway of the arm member 30c.

In this manner, the hinge device 10 (10A) includes the lock member 30 having the rotation shaft selecting function of enabling selective switching between rotation of the first shaft 24 and rotation of the second shaft 26 in accordance with the opening/closing angle position between the display chassis 14 and the main body chassis 16. The lock member 30 is disposed at the side of the first shaft 24 and the second shaft 26 that are disposed side by side. Thus, the inter-shaft distance between the first shaft 24 and the second shaft 26 can be minimized without the influence of the lock member 30, and the height of the hinge device 10 (10A) in the 0-degree position illustrated in FIG. 2A (FIG. 4A) can be reduced. As a result, the configuration described above can contribute to a thickness reduction of the portable information equipment 12 including the hinge device 10 (10A).

As has been described, the present disclosure provides an improved hinge device that can selectively switch rotation of two shafts in accordance with an opening/closing angle position between two chassis.

The present invention is not limited to the embodiment described above, and various other changes and modifications may be affected therein without departing from the scope or spirit of the present invention. For example, in the hinge device 10 (10A) of the embodiment described above, the projections 30a and 30b of the lock member 30 are selectively engaged with the recesses 24a and 26a respectively provided in the shafts 24 and 26 so that the first shaft 24 and the second shaft 26 are switched in two stages of a range from the 0-degree position to the 180-degree position and a range from the 180-degree position to the 360-degree position. Alternatively, two recesses 26a may be provided in symmetric positions in the second shaft 26, for example, so that the first shaft 24 and the second shaft 26 can be switched in three stages of a range from the 0-degree position to the 90-degree position, a range from the 90-degree position to the 270-degree position, and a range from the 270-degree position to the 360-degree position, for example.

The lock member 30 does not need to be disposed in front of the first shaft 24 and the second shaft 26, and may be disposed at the back of the first shaft 24 and the second shaft 26.

While the disclosure has been particularly shown and described with reference to a preferred embodiment, it will be understood by those skilled in the art that various changes in form and detail may be made therein without departing from the spirit and scope of the disclosure.

What is claimed is:

1. A hinge device comprising:
   a first shaft attached to a first chassis, wherein said first shaft includes a recess located on an outer peripheral surface of said first shaft;
   a second shaft attached to a second chassis, wherein said second shaft includes a recess located on an outer peripheral surface of said second shaft;
   a lock member including
      a first projection engageable with said first recess;
      a second projection engageable with said second recess; and
      an arm member coupling said first projection and said second projection to each other, being swayable by supporting a portion of said arm member between said first projection and said second projection by a rotation shaft, and disposed at a side of said first shaft and said second shaft that are disposed side by side,
   wherein said lock member allows rotation of one of said first shaft or said second shaft and restricts rotation of said each other in accordance with an opening/closing angle position between said first chassis and said second chassis by alternately performing engagement of said first projection with said first recess and engagement of said second projection with said second recess by means of sway of said arm member.

2. The hinge device of claim 1, wherein said first projection faces said outer peripheral surface of said first shaft, and said second projection faces said outer peripheral surface of said second shaft.

3. The hinge device of claim 2, further comprising
   a hinge block rotatably supporting said first shaft and said second shaft, wherein said lock member is housed in said hinge block, and
   said arm member is supported on said hinge block through said rotation shaft.

4. The hinge device of claim 3, wherein
   said hinge device couples a back end portion of said first chassis to a back end portion of said second chassis so that said first chassis and said second chassis can be opened and closed, and
   said hinge block includes a run-off portion that is provided in an outer surface thereof facing back ends of said first chassis and said second chassis, is recessed toward front ends of said first chassis and said second chassis, and is thereby interposed between said first shaft and said second shaft.

5. The hinge device of claim 1, wherein said first chassis is opened from a 0-degree position in which said first chassis is closed with respect to said second chassis and moves rotationally to a 360-degree position in which an upper surface of said first chassis faces a lower surface of said second chassis.

6. A portable computing device comprising:
   a first chassis and a second chassis; and
   a hinge device attached to said first chassis and said second chassis, wherein said hinge device includes
      a first shaft attached to said first chassis, wherein said first shaft includes a recess located on an outer peripheral surface of said first shaft;
      a second shaft attached to said second chassis, wherein said second shaft includes a recess located on an outer peripheral surface of said second shaft;
      a lock member including
         a first projection engageable with said first recess;

a second projection engageable with said second recess; and an arm member coupling said first projection and said second projection to each other, being swayable by supporting a portion of said arm member between said first projection and said second projection by a rotation shaft, and disposed at a side of said first shaft and said second shaft that are disposed side by side, wherein said lock member allows rotation of one of said first shaft or said second shaft and restricts rotation of said each other in accordance with an opening/closing angle position between said first chassis and said second chassis by alternately performing engagement of said first projection with said first recess and engagement of said second projection with said second recess by means of sway of said arm member.

7. The portable computing device of claim 1, wherein said first projection faces said outer peripheral surface of said first shaft, and said second projection faces said outer peripheral surface of said second shaft.

8. The portable computing device of claim 7, further comprising a hinge block rotatably supporting said first shaft and said second shaft, wherein said lock member is housed in said hinge block, and said arm member is supported on said hinge block through said rotation shaft.

9. The portable computing device of claim 8, wherein said hinge device couples a back end portion of said first chassis to a back end portion of said second chassis so that said first chassis and said second chassis can be opened and closed, and said hinge block includes a run-off portion provided in an outer surface thereof facing back ends of said first chassis and said second chassis, is recessed toward front ends of said first chassis and said second chassis, and is interposed between said first shaft and said second shaft.

10. The portable computing device of claim 6, wherein said first chassis is opened from a 0-degree position in which said first chassis is closed with respect to said second chassis and moves rotationally to a 360-degree position in which an upper surface of said first chassis faces a lower surface of said second chassis.

* * * * *